(12) United States Patent
Lewis et al.

(10) Patent No.: US 10,417,459 B2
(45) Date of Patent: Sep. 17, 2019

(54) PHYSICAL BARRIER TO INHIBIT A PENETRATION ATTACK

(71) Applicant: Utimaco, Inc., Campbell, CA (US)

(72) Inventors: John M. Lewis, Sunnyvale, CA (US); Alvin H. Diep, Sunnyvale, CA (US)

(73) Assignee: UTIMACO, INC., Campbell, CA (US)

( * ) Notice: Subject to any disclaimer, the term of this patent is extended or adjusted under 35 U.S.C. 154(b) by 133 days.

(21) Appl. No.: 15/507,697

(22) PCT Filed: Apr. 29, 2015

(86) PCT No.: PCT/US2015/028241
§ 371 (c)(1),
(2) Date: Feb. 28, 2017

(87) PCT Pub. No.: WO2016/175789
PCT Pub. Date: Nov. 3, 2016

(65) Prior Publication Data
US 2017/0286724 A1 Oct. 5, 2017

(51) Int. Cl.
| G08B 29/00 | (2006.01) |
| G08B 21/00 | (2006.01) |
| G08B 13/00 | (2006.01) |
| G06F 11/00 | (2006.01) |
| G06F 1/26 | (2006.01) |
| G06F 21/86 | (2013.01) |
| G06F 21/76 | (2013.01) |
| H04L 29/06 | (2006.01) |

(52) U.S. Cl.
CPC ............ G06F 21/86 (2013.01); G06F 21/76 (2013.01); H04L 63/0428 (2013.01)

(58) Field of Classification Search
CPC ....... G06F 21/86; G06F 21/76; H04L 63/0428
USPC ............................................... 726/34
See application file for complete search history.

(56) References Cited

U.S. PATENT DOCUMENTS

| 5,389,738 A * | 2/1995 | Piosenka ................. G01K 7/01 174/528 |
| 8,137,139 B2 * | 3/2012 | Selwood ................ G06F 21/85 439/660 |
| 8,586,871 B2 | 11/2013 | Bernsteain et al. |

(Continued)

FOREIGN PATENT DOCUMENTS

| WO | WO-2013091400 A1 | 6/2013 |
| WO | WO-2014158159 A1 | 10/2014 |

OTHER PUBLICATIONS

Steve H. Weingart; Physical Security Devices for Computer Subsystems: A Survey of Attacks and Defenses; springer.com; p. 302-317 (Year: 2000).*

(Continued)

Primary Examiner — Monjur Rahim
(74) Attorney, Agent, or Firm — Wilmer Cutler Pickering Hale and Dorr LLP

(57) ABSTRACT

An apparatus that includes a substrate and a first plurality of circuit components mounted on the substrate, which is associated with a protected area. The apparatus includes a connector formed on the substrate to at least partially circumscribe the protected area and a second plurality of circuit components mounted on the substrate to at least partially circumscribe the connector to form a security barrier to physically inhibit a penetration attack into the protected area.

15 Claims, 5 Drawing Sheets

(56) References Cited

U.S. PATENT DOCUMENTS

| | | |
|---|---|---|
| 8,659,908 B2 | 2/2014 | Adams et al. |
| 2008/0251906 A1 | 10/2008 | Eaton et al. |
| 2009/0146267 A1* | 6/2009 | Peytavy ................ H01L 23/576 257/659 |
| 2010/0024046 A1 | 1/2010 | Johnson, Jr. et al. |
| 2012/0047374 A1 | 2/2012 | Klum et al. |
| 2013/0161086 A1 | 6/2013 | Mayer et al. |
| 2016/0155679 A1* | 6/2016 | Davies ................. H01L 23/576 257/693 |
| 2018/0061196 A1* | 3/2018 | Busby ................. G08B 13/128 |
| 2018/0098423 A1* | 4/2018 | Brodsky ............. H05K 5/0208 |

OTHER PUBLICATIONS

International Search Report and Written Opinion, International Application No. PCT/US2015/028241, dated Feb. 25, 2016, pp. 1-8, KIPO.

SBIR/STTR, "Low-profile Tamper Detection Sensors," 2007, pp. 1-2, Available at: <sbir.gov/sbirsearch/detail/156626>.

* cited by examiner

PHYSICAL BARRIER TO INHIBIT A PENETRATION ATTACK

BACKGROUND

A given computer system (a data center, for example) that processes and/or stores sensitive data typically employs measures to protect the data from unauthorized access. For example, the computer system may process and/or store such sensitive information, as credit cardholder data, patient records, personnel information, intellectual property, and so forth.

The protective measures may guard against unauthorized access while the sensitive data is in motion (while the data is being communicated across communication channels, for example). For example, the computer system may encrypt data that is communicated across communication channels. The protective measures may further guard against access to cryptographic keys that are stored by the computer system and used by the system to encrypt/decrypt the sensitive data.

BRIEF DESCRIPTION OF THE DRAWINGS

FIG. 2B is an illustration of an example lateral penetration attack on the circuit assembly of FIG. 2A.

DETAILED DESCRIPTION

Figure 1:
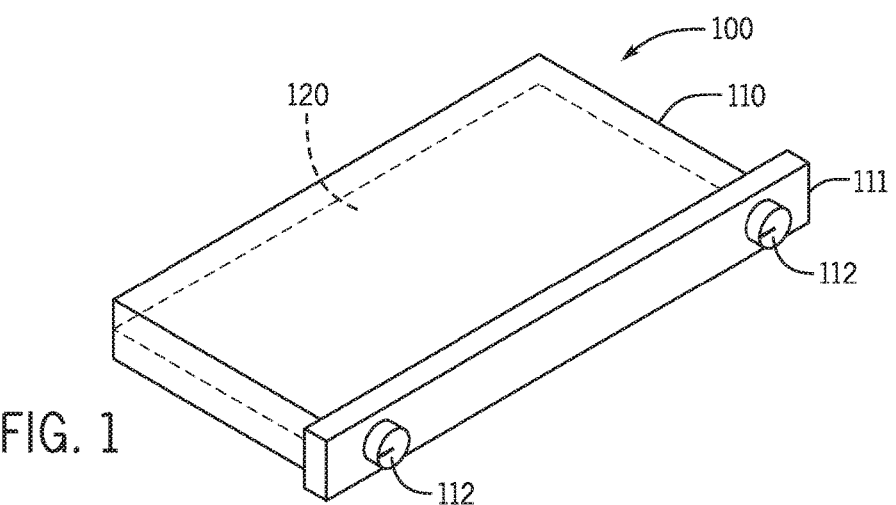
FIG. 1 is a perspective view of a secure key manager according to an example implementation.

An electronic system that processes and/or stores sensitive data (data representing patient records, personnel records, credit cardholder information, banking information, intellectual property, and so forth) may store one or multiple security keys that are used by the electronic device to encrypt and decrypt the sensitive data while in transit. In this manner, the electronic system may communicate encrypted, sensitive data for internal communications within the electronic device (communications between the system's processing cores and memories, for example), as well as communicate encrypted, sensitive data in external communications between the system and other electronic systems.

For purposes of encrypting and decrypting sensitive data, the electronic system may use one or multiple cryptographic keys, called "security keys" herein. In this manner, the electronic system may store the security key(s) in one or more protected memories of the system. Because access to the security keys allows access to the underlying sensitive data, the electronic system may employ a number of security measures to prevent, or at least inhibit, unauthorized access to the stored key(s). For example, sensitive components of the electronic system, which store security key(s) may be enclosed by a locked, metal container, which forms at least part of an outer physical security barrier to guard against unauthorized access to the stored key(s). In this manner, the metal enclosure may have no open ports through which a tool (a probe, a punch through device, and so forth) may be easily inserted for such purposes as sensing electrical signals (representing the keys, for example), physically extracting memory storing security keys, and so forth.

The metal container may still be vulnerable to a "penetration attack" on the electronic system. A penetration attack is a physical attack on an electronic system in which a tool is used to penetrate the system's physical security barrier for purposes of gaining access to information (such as one or multiple security keys) that is stored in the system. For example, the tool may contain a drill or punch to form a hole in the metal container (and/or other enclosure or security barrier) of the electronic system, and a probe may be inserted into the hole to sense one or multiple electrical signals of the electronic system for purposes of retrieving the security key(s).

Example implementations are disclosed herein in which an electronic system has multiple security barrier layers to protect sensitive data stored by circuit component(s) (ICs, microprocessors, memories, and so forth) of the system. As mentioned above, a particular security barrier layer may be an outer protective metal container, and access to the interior of the metal container may be protected through the use of one or multiple locks. Another security barrier layer may be formed from in part from circuit substrates (a printed circuit board (PCB) substrate, a flexible circuit substrate, and so forth) that surround circuit components containing sensitive data. In this manner, the circuit substrates have built-in penetration detection boundaries, and the circuit components may be mounted one or more of these substrates.

More specifically, a penetration detection boundary may be formed in one or multiple metal layers of a given circuit substrate, where each of these metal layers has one or multiple penetration detection traces. A penetration detection trace is arranged in a pattern (a serpentine pattern, for example) for purposes of defining an area that is monitored by the electronic system to detect its penetration. In this manner, the trace is constructed so that a penetration in the area breaks the trace and disrupts a signal that is monitored by the system.

In response to being alerted to a penetration attack, the electronic system may take one or more appropriate corrective actions, such as actions involving alerting a system administrator; alerting security personnel; erasing the security key(s) before the key(s) are extracted; shutting down operations of the electronic system, and so forth.

In accordance with example implementations described herein, a security barrier layer of the electronic system may be formed from an assembly that contains two planar, penetration boundary-containing circuit substrates. More specifically, in accordance with example implementations, the protected circuit components may be mounted on one of the circuit substrates (a PCB substrate, for example) to detect a penetration attack occurring through this substrate, and the other circuit substrate (a flexible circuit substrate, for example) may cover the components for purposes of detecting a penetration attack through this other substrate.

The above-described assembly may be vulnerable to a lateral penetration attack that occurs between (and not through) the circuit substrates. More specifically, a penetration attack may conceivably occur in which a probe or other tool is inserted between the circuit substrates. In this manner, a tool may be inserted between the circuit substrates for purposes of probing electrical signals or extracting circuitry (memory containing stored data, for example). Electrically conductive gaskets may be disposed between circuit substrates for purposes of allowing the electronic system to use gasket contact circuits to detect separation of the circuit substrates (i.e., to detect tampering). The gasket has a finite thickness, which may provide an opening for a tool to be laterally inserted between adjacent gaskets. It is also possible for a gasket to be sufficiently flexible to allow a tool to be inserted between the gasket and one of the substrates, even though the gasket contact circuits may indicate full gasket contact.

In accordance with example implementations that are described herein, circuit components are disposed on at least one of the circuit substrates to form a physical barrier to inhibit, if not prevent, a lateral penetration attack.

Referring to FIG. 1, as a more specific example, an electronic system (a processor-based data center, for example) may contain one or multiple secure key managers, such as example secure key manager 100, for purposes of managing, protecting, serving and preserving security keys for the system. The secure key manager 100 may, in accordance with example implementations, be a blade that is constructed to be received in a backplane bus slot of a computer system rack.

The secure key manager 100 stores sensitive data, such as one or multiple security keys; and, in accordance with example implementations, the secure key managers 100 has one or multiple security barrier layers that are constructed to prevent a penetration attack from successfully accessing the sensitive data. As depicted in FIG. 1, the security barriers may include an outer physical, security barrier layer that is formed from a metal enclosure 110 that surrounds, or encloses, the circuit assembly 120.

In accordance with example implementations, the metal enclosure 110 may, in general, have no ports, or openings, through which a penetration attack may occur (through which a punch through tool or probe may be inserted, for example) for purposes of gaining access to the security key(s) and/or other sensitive information stored inside the secure key manager 100. The secure key manager 100 may communicate with external circuitry using (as examples) connector sockets, optical signaling, inductive coupling connections, and so forth. The metal enclosure 110 may include various security mechanisms, such as (as an example) key locks 112, which secure the enclosure 110 from being opened (by removal of a front panel 111 of the enclosure 110, for example) except when two keys (keys held by two authorized employees, for example) are concurrently inserted and turned.

It is conceivable that a penetration attack may occur, which involves drilling, punching out, or otherwise removing material of the metal enclosure 110 to gain access to circuit components of the circuit assembly 120.

The circuit assembly 120, in accordance with example implementations, has circuit substrate-based security barrier layers that allow the secure key manager 100 to detect a penetration attack through one of the assembly's circuit substrates. In this manner, in response to a penetration being detected, the secure key manager 100 may take appropriate corrective action (erasing sensitive data, contacting security personnel and so forth) for purposes of preventing the penetration attack from gaining access to the sensitive data.

Figure 2A:
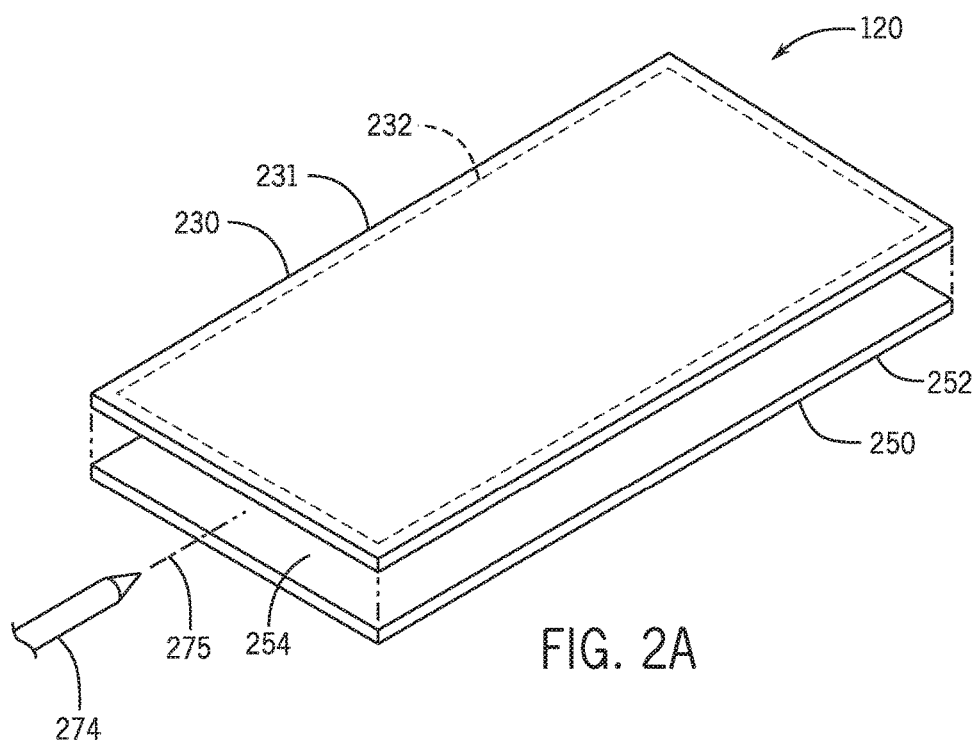
FIG. 2A is an exploded perspective view of a circuit assembly of the secure key manager of FIG. 1 according to an example implementation.

Referring to FIG. 2A, more specifically, in accordance with example implementations, the circuit assembly 120 includes an upper circuit substrate 230 and a lower circuit substrate 250. The upper 230 and lower 250 circuit substrates may be generally planar and parallel to each other, as depicted in FIG. 2A. In accordance with example implementations, each of the circuit substrates 230 and 250 contains a penetration detection boundary (such as example penetration detection boundary 232 for the upper substrate 230). The penetration detection boundary, as its name implies, is a barrier that is constructed to provide an indication to the secure key manager 100 to alert the manager 100 when at least partial penetration of the boundary occurs.

For the example implementation of FIG. 2A, the lower circuit substrate 250 may be a printed circuit board (PCB) substrate, and sensitive data-containing circuit components (not shown), such as integrated circuits (ICs) containing microprocessor cores, memories, and so forth of the secure key manager 100 may be mounted on an upper surface of the substrate 250 to form a corresponding lower circuit subassembly 252. These components are thus contained in a region 254 in which two boundaries of the region 254 are formed by the upper 230 and lower 250 circuit substrates. As examples, the sensitive data-containing circuit components may contain one or multiple semiconductor memory devices that form a cryptographic processor; one or multiple semiconductor memory devices that store sensitive data and security keys; microprocessor core containing components; gate arrays; logic devices; resistors, capacitors; and so forth. Moreover, the circuit components may perform various functions for the secure key manager 100, such as the functions of a key server; a key manager; a security monitor that detects and responds to a penetration attack; and so forth.

The lower circuit substrate 250, in accordance with example implementations, is a multiple layer substrate. In this manner, the lower circuit substrate 250 contains one or multiple metal layers that are configured to communicate power and signals for the circuit components that are mounted thereon. Moreover, the lower circuit substrate 250 may contain metal layers that form corresponding penetration detection layers. In this manner, the penetration detection layers of the lower circuit substrate 250 are constructed to indicate when a penetration attack occurs. In particular, the penetration detection layers of the lower circuit substrate 250 contain traces that are arranged to protect one or more areas, such that when a penetration attack occurs through the area(s), one or more of the traces break to alert the secure key manager 100.

The upper circuit substrate 230, in accordance with example implementations, may be a flexible circuit (as an example), and may contain a penetration detection boundary that is formed from one or multiple penetration detection layers of the substrate 230. In this manner, the penetration detection boundary of the upper substrate 230 may be used to indicate when penetration of the substrate 230 occurs. In general, the upper circuit substrate 230 is part of an upper circuit subassembly 231 and may contain features similar to the lower circuit subassembly 252, as further described herein.

Although the upper 230 and lower 250 circuit substrates contain penetration detection boundaries for purposes of detecting a penetration attack through either substrate 230 or 250, these penetration detection boundaries are not constructed to detect or prevent a lateral penetration attack along a path between the substrates 230 and 250. In this manner, it is possible, without features described herein, that a probe 274 (or other tool) may be generally directed along a path 275 in a plane that is parallel to the substrates 230 and 250 for purposes of probing signals/extracting circuitry of the secure key manager 100.

Moreover, if not for the features of the circuit assembly 120, which are described herein, the circuit assembly 120 may be susceptible to a lateral penetration attack, regardless of whether gasketing material is disposed between the upper 230 and lower 250 circuit substrates. More specifically, referring to FIG. 2B in conjunction with FIG. 2A, in accordance with example implementations, electrically conductive gaskets 260 may be disposed between the substrates 230 and 250 and surround the protected circuit components of the circuit assembly 120. When the circuit assembly 120 is intact, electrical connections are formed between the gaskets 260 and gasket contact circuits of the circuit substrates 230 and 250. The upper circuit subassembly 231, lower circuit subassembly 252 and intervening conductive gaskets 260 may be held together by compression clamps, screws or other mechanisms, in accordance with example implementations.

The secure key manager 100 may monitor the gasket contact circuits for purposes of monitoring the status of the electrical connections between the circuit substrates 230 and 250 and the gasket 260. In this manner, by monitoring the gasket contact circuits, the secure key manager 100 may detect partial or full disassembly of the circuit board assembly 120 (which may be used to gain access to the sensitive data). For example, the substrate 230 or 250 may be pulled apart from the gasket 260 and a tool (a signal detection probe, for example) may be inserted into the formed opening for purposes of sensing signals (and potentially sensitive data) of the secure key manager 100.

For implementations in which the electrically conductive gaskets 260 are disposed between the circuit subassemblies 231 and 252, a lateral penetration attack may still be attempted, even though the assembly 120 has not been opened. In this manner, as depicted in FIG. 2B, the gasket 260 has a finite thickness, which allows the probe 274 (or other tool) having a smaller thickness, or width, to be inserted between adjacent gaskets 260.

A lateral penetration attack may also be attempted between or under the gaskets 260. For example, a lateral penetration attack may occur between one of the conductive gaskets 260 and one of the substrates 230 and 250. In this manner, the conductive gasket 260 may have a sufficiently flexibility, which allows a probe (or other tool) to be inserted between the gasket 260 and the substrate 230 or 250 without disrupting electrical connections between the gasket 260 and the substrate (thereby not being detected by the gasket contact circuits).

In accordance with example implementations that are described herein, the circuit board assembly 120 has circuit components that are mounted to either one or both of the circuit substrates 230 and 250 for purposes of forming a physical barrier, or fence, to inhibit, if not block, lateral penetration attacks, regardless of whether gasketing material is disposed between the circuit substrates 230 and 250.

Figure 3A:
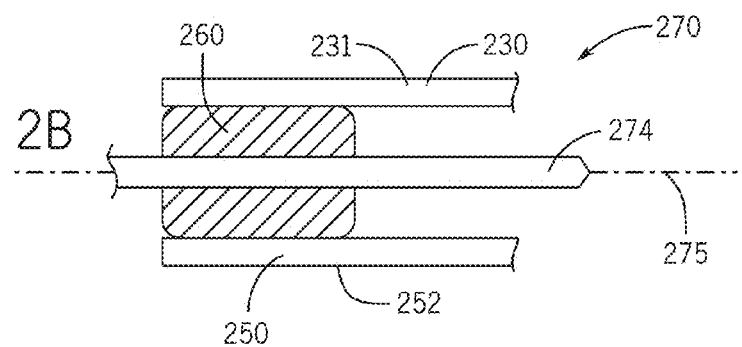
FIG. 3A is a top view of a lower circuit subassembly of FIG. 2A according to an example implementation.
Figure 3A:
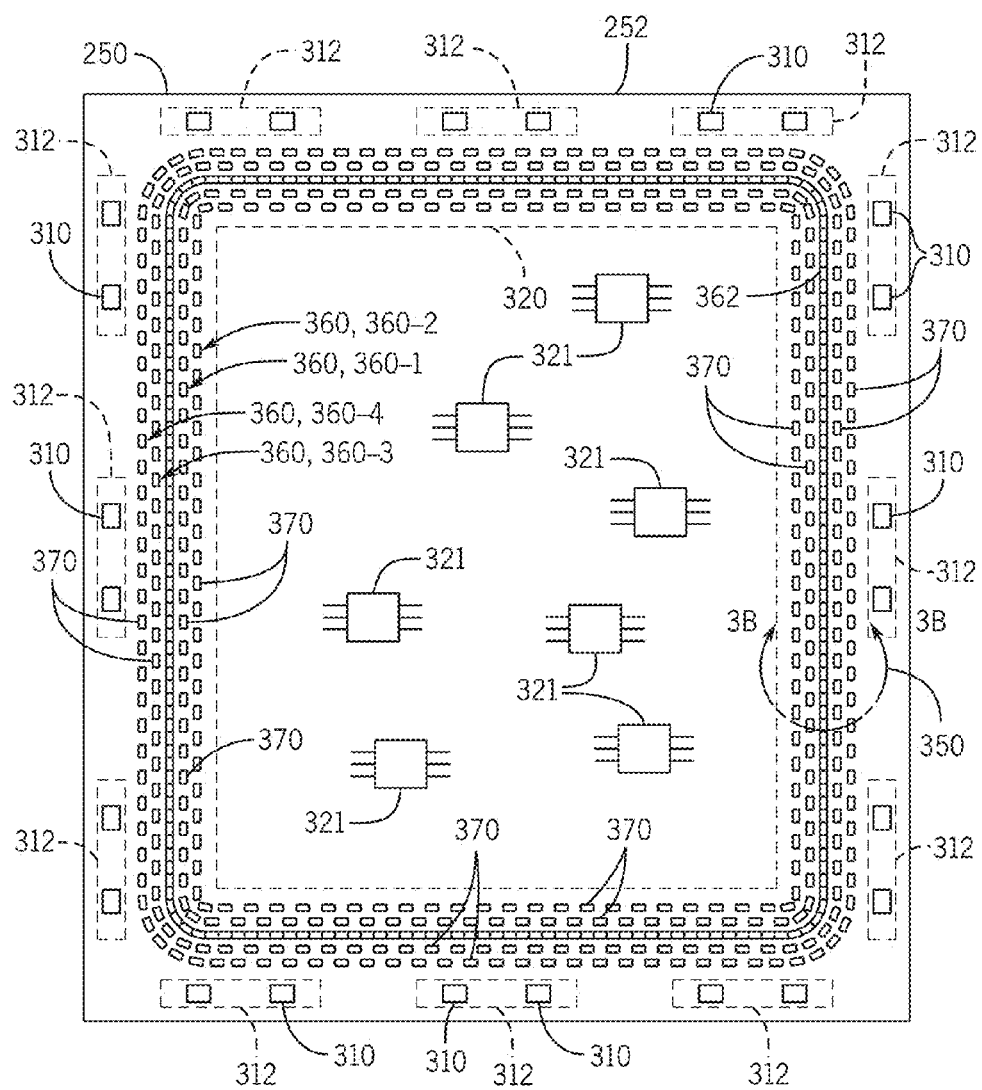

More specifically, FIG. 3A depicts a top view of the lower circuit subassembly 252, in accordance with example implementations. Referring to FIG. 3A in conjunction with FIG. 2A, in general, the lower circuit substrate 250 may be populated with various circuit components (integrated circuits (ICs), such as microprocessor core-based devices, memories, secure key managing ICs, and so forth), which are disposed in a protected region 320. At least one or more of these ICs has a memory that stores sensitive data (security keys, for example). In accordance with example implementations, electrically conductive gaskets 260 (see FIG. 2B) are spatially distributed about the outer perimeter of the substrate 250. As an example, in accordance with example implementations, the lower circuit substrate 250 contains border regions 312 that define the boundaries of the gaskets 260. In this manner, each border region 312 contacts an associated conductive gasket 260 (see also FIG. 2B) when the circuit assembly 120 is fully assembled. As depicted in FIG. 3A, in accordance with example implementations, within each border region 312, the lower circuit substrate 250 contains a pair of electrically conductive contact pads 310. The upper circuit substrate assembly 231 (see FIG. 2A) may have similar contact pads that are disposed around the perimeter of the upper circuit substrate 230. In general, the gasket contact pads of the upper 231 and lower 252 circuit subassemblies may be part of gasket contact circuits of the substrates 230 and 250, which allow the secure key manager 100 to detect when contact between at least one of the contact pads and the associated gasket 260 has been interrupted.

It is noted that the circuit assembly 120 may not contain conductive gaskets 260 (and thus, may either not include gasket contact circuitry or may have this circuitry disabled), in accordance with further example implementations.

Figure 3B:
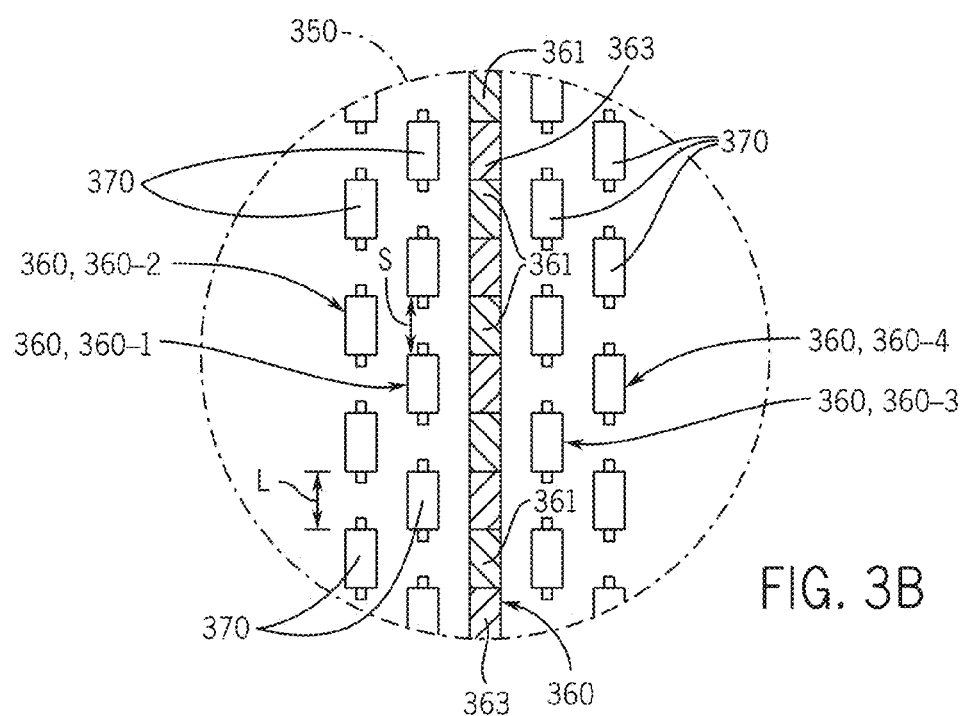
FIG. 3B depicts an enlarged portion of a circuit component-based security barrier of the circuit subassembly of FIG. 3A according to an example implementation.

For such purposes as allowing the secure key manager 100 to monitor the penetration detection boundaries and the gasket contact circuits of the upper 230 and lower 250 substrates, the circuit assembly 120 includes an electrical connector 362, which is depicted in FIG. 3A as being mounted on the upper circuit substrate 250. The electrical connector 362 resides inside the border regions 312 and generally circumscribes the protected area 320. As an example, the electrical connector 362 may be a polymer-based connector (a zebra connector, for example), which, as depicted in FIG. 3B, may have alternating conductive 361 and insulative 363 sections. The electrical connector 362 may be held in compression between the upper 230 and lower 250 circuit substrates for purposes of contacting electrically conductive pads (not shown) on the substrates 230 and 250 to electrically couple the substrates 230 and 250 together.

For purposes of inhibiting a tool from being laterally inserted (in a lateral penetration attack) into the protected area 320, the circuit assembly 120 includes circuit components 370 that are mounted on one or both of the circuit substrates 120 and 250 to form one or more physical barriers. For the example implementation that is depicted in FIG. 3A, circuit components 370 are mounted on the lower circuit substrate 250. Similar circuit components may be mounted on the upper circuit substrate 230, in accordance with example implementations.

Depending on the particular implementation, circuit components 370 may be mounted on the lower circuit substrate 250 to form an outer physical security barrier that circumscribes the electrical connector 362; and/or circuit components 370 may be mounted on the lower circuit substrate 250 to form an inner physical security barrier that is circumscribed by the electrical connector 362. Each of these component-based security barriers, in turn, inhibit, if not prevent, a lateral penetration attack between the upper 230 and lower 250 circuit substrates.

The component-based physical security barrier, in accordance with example implementations, is formed from at least two rows 360 (example rows 360-1, 360-2, 360-3 and 360-4, being depicted in FIG. 3A) of circuit components 370. Each row 360, for these example implementations, circumscribes the protected region 320 and is circumscribed by the border regions 312.

More specifically, referring to FIG. 3B in conjunction with FIG. 3A, in accordance with example implementations, the inner circuit component-based physical security barrier may be formed from a first inner row 360-2 of circuit components 370, which are circumscribed by the connector 362; and a second inner row 360-1 of circuit components 370, which circumscribe the first inner row 360-2 and are also circumscribed by the connector 362. As depicted in FIGS. 3A and 3B, the components 370 of the inner rows 360-1 and 360-2 are staggered with respect to each other to form a physical barrier, or fence, for purposes of blocking a lateral penetration attack.

For example, in accordance with some implementations, the electrical components 370 of the inner row 360-1 are regularly spaced apart by a spacing S; and likewise, the circuit components 370 of the inner row 360-2 are spaced apart by the spacing S. For this example, a length L of the component 370 is less than the spacing S. The components 370 of the inner rows 360-1 and 360-2 are spatially staggered relative to each other, and because the component length L is greater than the component spacing S, the inner rows 360-1 and 360-2 form a fence for purposes of blocking a lateral penetration attack from reaching the protected region 320.

In accordance with example implementations, another component-based physical barrier may be formed outside of the electrical connector 362 for purposes of inhibiting, if not preventing, a lateral penetration attack from reaching the connector 362. In this manner, in a similar manner to the inner rows 360-1 and 360-2, outer rows 360-3 and 360-4 of the components 370 may be mounted on the substrate 250 outside of the electrical connector 362. The components 370 of the outer row 360-3 are spatially staggered with respect to the components 370 of the outer row 360-4 to form a physical security barrier that circumscribes the electrical connector 362. Thus, the outer component-based physical security barrier provides protection for the electrical connector 362 and the circuit components of the protected region 320 from a lateral penetration attack; and the inner component-based physical security barrier provides protection for the circuit components of the protected region 320.

Figure 4:
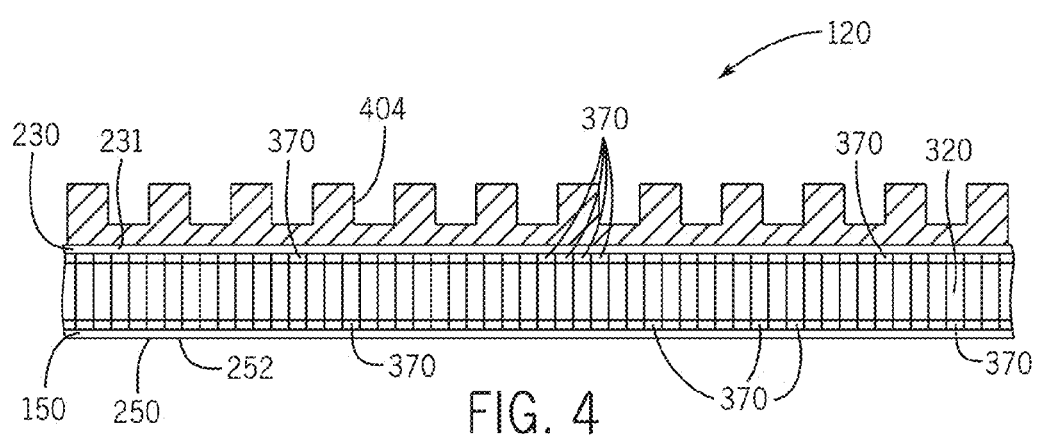
FIG. 4 is a side view of a circuit assembly according to an example implementation.

Although one or more physical security barriers are discussed above for the lower circuit subassembly 252, an inner and/or outer component-based security barrier may be disposed on the upper circuit substrate 230 (see FIG. 2A), in accordance with further example implementations. In this manner, referring to FIG. 4, in accordance with example implementations, the circuit board assembly 120 may include component-based physical security barriers that are formed on both the upper 230 and lower 250 substrates, in accordance with example implementations. As also shown in FIG. 4, in accordance with some implementations, a heat sink 404 may be mounted to the upper substrate 230 for purposes of removing thermal energy dissipated by the circuit components of the assembly 120.

The circuit components 370 that are used to form the physical security barriers may take on numerous different forms, depending on the particular implementation. In accordance with some implementations, one or multiple circuit components 370 may be surface mount components. Moreover, one or multiple circuit components 370 may be passive components, such as resistors and/or capacitors. In accordance with some implementations, one or multiple circuit components 370 may be inactive integrated circuits (i.e., the circuit component 370 may be a circuit that is not wired to receive power or otherwise perform an electrical function). In accordance with further example implementations, one or multiple circuit components 370 may be active, integrated circuits that serve functions for the secure key manager 100, other than the function of physically inhibiting a lateral penetration attack. Moreover, depending on the particular implementation, the circuit components 370 may include a mixture of include one or more of the specific circuit components 370 mentioned above. The circuit components 370 may take on other forms, in accordance with further implementations. Thus, many variations are contemplated, which are within the scope of the appended claims.

Figure 5:
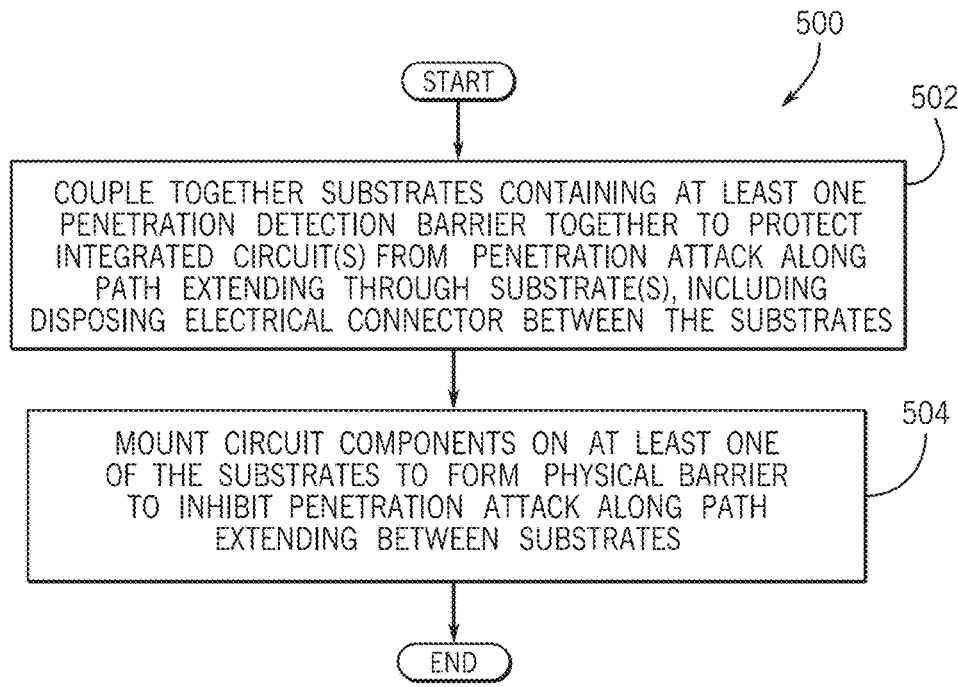
FIG. 5 is a flow diagram depicting a technique to use circuit components to form a physical security barrier to inhibit a penetration attack according to an example implementation.

Thus, referring to FIG. 5, in accordance with example implementations, a technique 500 includes coupling (block 502) together substrates that include at least one penetration detection boundary to protect at least one integrated circuit from a penetration attack along a path extending through at least one of the substrates. Coupling the substrates together includes disposing a connector between the substrates. The technique 500 includes mounting (block 504) circuit components on at least one of the substrates to form a physical barrier to inhibit a penetration attack along a path extending between the substrates.

In accordance with further example implementations, the rows of a given component-based physical barrier may monitored by the secure key manager 100 for purposes of detecting an electrical connection that may be created when a probe (or other tool) is inserted between the rows. In this regard, in accordance with example implementations, the components 370 of a given row 360 are mounted such that the terminals of the components are in-line with the row, as depicted in FIG. 3B. Due to this arrangement, if a conductive probe (or other tool) is inserted in a diagonally extending path between rows, the probe is likely to contact component terminals in these rows. In accordance with example implementations, the secure key manager 100 may activate one or both rows of a given inner or outer security barrier with predetermined signals or voltages so that by monitoring signals provided by the rows, the secure key manager 100 may detect the insertion of a probe between the rows. Thus, the component-based security barrier may also be used for purposes of detecting a lateral penetration attack, in accordance with example implementations.

Figure 6:
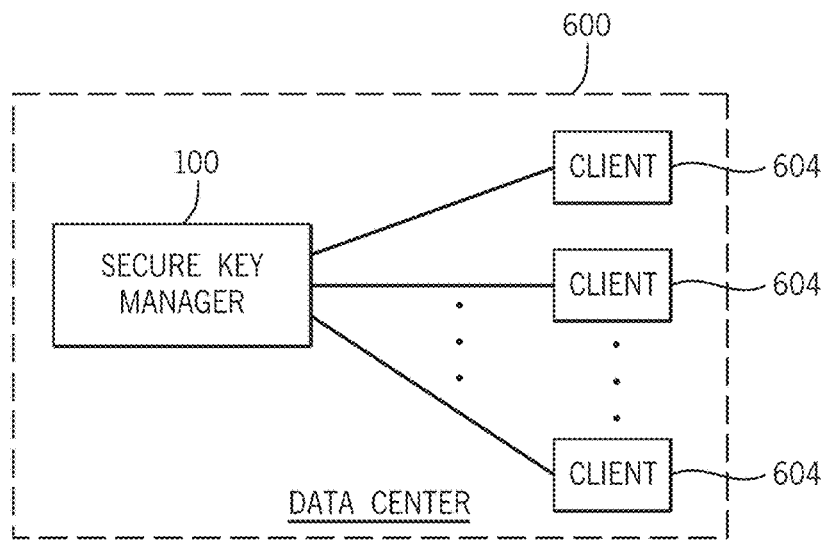
FIG. 6 is a schematic diagram illustrating a data center according to an example implementation.

Referring to FIG. 6, in accordance with example implementations, the secure key manager 100 may be part of a data center 600, in which the secure key managing server 100 manages, stores and serves keys for one or multiple clients 604 of the data center 600. As an example, the secure key manager 100 and clients 604 may be blades that are inserted into one or more racks of the data center 600.

Figure 7:
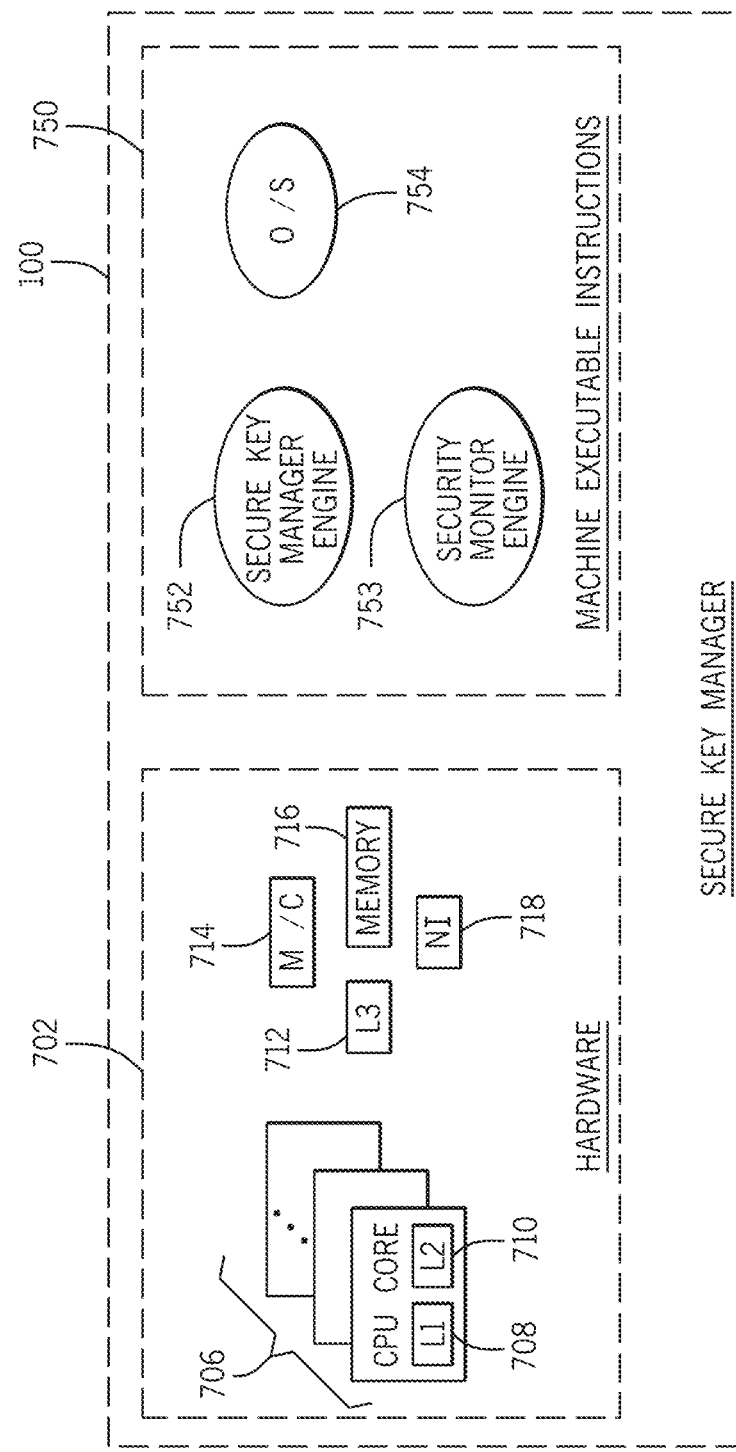
FIG. 7 is a schematic diagram illustrating an architecture of the secure key manager according to an example implementation.

In accordance with example implementations, the secure key manager 100 may have an architecture that is schematically represented in FIG. 7. In general, the secure key manager 100 may include hardware 702 and machine executable instructions, or "software," 750. In general, the hardware 702 may be formed from the electronic components and may include one or multiple central processing unit (CPU) cores 706. In accordance with example implementations, each CPU core 706 may include onboard memory, such as level one (L1) cache 708 and a level two (L2) cache 710.

The hardware 702 may also include memory that is accessed by the CPU core(s) 706, such as a level three (L3) cache 712 and a system memory 716. In accordance with an example implementation, a given set of one or multiple CPU cores 706 may form a cryptographic processor, and at least one secure key may be stored in of this cryptographic processor (in a memory of the processor, such as in an L1 or L2 cache of the processor, for example).

The hardware 702 may include other and/or different components than the components that are depicted in FIG. 7 in further example implementations, such as a memory controller 714, a network interface 718, and so forth.

The software 750 may include a set of machine executable instructions that, when executed by one or multiple CPU core(s) 706, cause the CPU core(s) 706 to form a secure key manager engine 752 to manage, serve and protect keys as well as perform various cryptographic ciphers. The software 750 may include a set of machine executable instructions that, when executed by one or multiple CPU core(s) 1006, cause the CPU core(s) 706 to form a security monitor engine 753 to provide signals to the penetration detection traces, receive signals from the penetration detection traces to detect a penetration attack; take corrective action in response to detecting a penetration attack; provide signals to the gasket contact detection pads; receive signals from the gasket contact detection pads; take corrective action in response to detecting full or partial disassembly of the circuit assembly 120; and so forth. Moreover, in accordance with example implementations, the security monitor engine 753 may provide one or multiple signals to one or multiple components of a component-based security barrier and monitor signals that are provided by one or multiple components of the security barrier for purposes of detecting when a probe or other electrically conductive member has been inserted between rows of the component-based security barrier. The security monitor engine 753 may also take appropriate corrective action in response to the component-based security barrier indicating a penetration attack. The software 750 may include different and/or other machine executable instructions that when executed may form various other software components, such as an operating system 754, device drivers, applications and so forth.

Other implementations are contemplated, which are within the scope of the appended claims. For example, in accordance with further example implementations, a circuit board assembly that includes a circuit component-based security barrier to prevent or at least inhibit a penetration attack may be used in system other than a system that is part of a data center. For example, in accordance with further example implementations, a circuit board assembly that includes a circuit component-based security barrier to prevent or at least inhibit a penetration attack may be used in an electronic device other than a secure key manager and may be used to inhibit a penetration attack for purposes other than protecting security keys and/or protecting sensitive data. In accordance with further example implementations, an inner and/or outer circuit component-based security barrier may include more than two rows of circuit components.

It is noted that references herein to direction and orientation, such as "upper" and "lower," are used herein to describe the figures; and the substrates, circuit assemblies, layers, and so forth, may be used in a variety of orientations, depicting on the particular implementation. For example, the circuit assembly 120, in accordance with example implementations, may be used in an orientation that is flipped over or turned on its inside, relative to the orientation that is depicted in FIG. 2A.

While the present techniques have been described with respect to a number of embodiments, it will be appreciated that numerous modifications and variations may be applicable therefrom. It is intended that the appended claims cover all such modifications and variations as fall within the scope of the present techniques.

What is claimed is:

1. An apparatus comprising:
    a first substrate configured to provide a first physical barrier for a protected area that contains one or more protected circuit components;
    a connector contact formed on the first substrate, the connector contact being configured to couple the first substrate to a second substrate, the second substrate providing a second physical barrier for the protected area; and
    a plurality of sets of two or more electrical contacts formed on the first substrate and at least partially circumscribing the protected area, the plurality of sets of two or more electrical contacts being configured for mounting a corresponding plurality of circuit components to the first substrate, each of the plurality of circuit components having a matching set of two or more electrical contacts, wherein the plurality of circuit components provide a third physical barrier for the protected area,
    wherein the first, second, and third physical barriers are each configured to physically inhibit a penetration attack into the protected area.

2. The apparatus of claim 1, wherein the plurality of circuit components comprise:
    a first row of circuit components having first spaces between adjacent circuit components of the first row; and
    a second row of circuit components to at least partially circumscribe the first row of circuit components, wherein the circuit components of the second row are staggered with respect to the circuit components of the first row to physically block insertion of a tool associated with the penetration attack through one of the first spaces.

3. The apparatus of claim 1, wherein the plurality of circuit components comprise one or more integrated circuits.

4. The apparatus of claim 1, wherein:
    the plurality of sets of two or more electrical contacts completely circumscribe the protected area; and
    the first substrate comprises a first penetration detection layer to provide a first electrical response to the penetration attack entering the protected area from a first direction.

5. The apparatus of claim 4, wherein the second substrate comprises a second penetration detection layer to provide a second electrical response to the penetration attack entering the protected area from a second direction.

6. A method comprising:
    coupling together a plurality of substrates to form a partial enclosure that protects at least one integrated circuit from a penetration attack along a first path extending through at least one of the substrates, the partial enclosure including at least one gap between the plurality of substrates; and
    mounting a plurality of circuit components on at least one of the plurality of substrates to form a physical barrier to protect the at least one integrated circuit from a penetration attack along a second path extending through the at least one gap, wherein each of the plurality of circuit components includes at least two electrical terminals and is mounted to a matching set of at least two electrical contacts formed on the at least one of the plurality of substrates.

7. The method of claim 6, further comprising disposing a conductive gasket between at least two of the plurality of substrates, the conductive gasket being configured to provide an electrical response to an attempted disassembly of the partial enclosure.

8. The method of claim 6, wherein mounting the plurality of circuit components to form the physical barrier comprises arranging the plurality of circuit components to form a plurality of staggered rows.

9. The method of claim 6, wherein at least one of the plurality of circuit components is configured to provide an electrical response to the penetration attack along the second path through a respective matching set of at least two electrical contacts.

10. The method of claim 6, wherein the physical barrier forms an inner security barrier that is circumscribed by an electrical connector disposed between at least two of the plurality of substrates.

11. An apparatus comprising:
a first substrate comprising a first penetration detection layer to provide a first electrical response to a penetration attack through the first substrate;
an integrated circuit mounted on the first substrate;
a second substrate comprising a second penetration detection layer to provide a second electrical response to a penetration attack through the second substrate;
a connector disposed between the first and second substrates and circumscribing the integrated circuit, the connector being configured to electrically couple the first and second penetration detection layers; and
a plurality of circuit components mounted on the first substrate to circumscribe the connector to form a physical barrier to inhibit a penetration attack through the connector, wherein each of the plurality of circuit components are mounted between a matching pair of conductive pads formed on the first substrate.

12. The apparatus of claim 11, wherein the plurality of circuit components comprise one or more passive integrated circuit components.

13. The apparatus of claim 11, wherein the plurality of circuit components comprise:
a first row of circuit components to circumscribe the connector, wherein adjacent circuit components of the first row have first spaces therebetween; and
a second row of circuit components to circumscribe the first row of circuit components, wherein the circuit components of the second row are staggered with respect to the circuit components of the first row.

14. The apparatus of claim 11, wherein the integrated circuit comprises a secure key manager.

15. The apparatus of claim 11, further comprising:
a metal enclosure enclosing the first substrate, the second substrate, the integrated circuit, the connector and the plurality of circuit components.

* * * * *